United States Patent [19]

Larson et al.

[11] Patent Number: 4,865,747
[45] Date of Patent: Sep. 12, 1989

[54] ELECTROMAGNETIC FLUID TREATING DEVICE AND METHOD

[75] Inventors: Kenneth J. Larson; Gary P. Lunde, both of LaCrosse, Wis.

[73] Assignee: Aqua-D Corp., Adamsville, Tenn.

[21] Appl. No.: 148,924

[22] Filed: Jan. 27, 1988

[51] Int. Cl.$^4$ ............................................. C02F 1/48
[52] U.S. Cl. .................... 210/695; 210/222; 210/243; 210/748; 55/2; 55/100
[58] Field of Search ............ 210/222, 223, 695, 748, 210/243; 55/2, 3, 100; 123/536, 537, 538, 539; 184/6.25

[56] References Cited

U.S. PATENT DOCUMENTS

| | | | |
|---|---|---|---|
| 438,579 | 10/1890 | Faunce et al. | 210/222 |
| 1,949,660 | 3/1934 | Roberts | 210/223 |
| 2,583,522 | 1/1952 | Winslow et al. | 210/222 |
| 2,596,743 | 5/1952 | Vermeiren | 210/222 |
| 2,652,925 | 9/1953 | Vermeiren | 210/222 |
| 2,825,464 | 3/1958 | Mack | 210/222 |
| 2,939,830 | 6/1960 | Green et al. | 210/222 |
| 3,349,354 | 10/1967 | Miyata | 210/222 |
| 3,625,884 | 12/1971 | Waltrip | 210/748 |
| 3,669,274 | 6/1972 | Happ et al. | 210/222 |
| 3,680,705 | 8/1972 | Happ et al. | 210/222 |
| 3,819,515 | 6/1974 | Allen | 210/222 |
| 3,923,660 | 12/1975 | Kottmeier | 210/222 |
| 3,951,807 | 4/1976 | Sanderson | 210/222 |

(List continued on next page.)

FOREIGN PATENT DOCUMENTS 625732 7/1949 United Kingdom .
675369 7/1952 United Kingdom .

OTHER PUBLICATIONS

Joseph L. Katz, "Mechanistic Study of the Effects of Magnetic Fields on Scale Formation", The Johns Hopkins University, Baltimore, Md. 21218 (1986).
Kenneth W. Busch, et al., "Laboratory Studies Involving Magnetic Water Treatment Devices", Corrosion 85, Paper No. 251 (1985).
James F. Grutsch, et al., "Corrosion and Deposit Control in Alkaline Cooling Water Using Magnetic Water Treatment at Amoco's Largest Refinery", Corrosion 85, Paper No. 330 (1984).
L. G. Simpson, "Control Scale and Save Energy", The Coast Guard Engineer's Digest, pp. 32-35 (U.S. Department of Transportation, Winter 1980).

Primary Examiner—W. Gary Jones
Attorney, Agent, or Firm—John C. Cooper, III

[57] ABSTRACT

An electromagnetic field treating device includes a conduit formed of nonmagnetic material having an inlet and an outlet such that fluid can pass through the conduit in a direction which is parallel to the axis of the conduit, and a ferromagnetic core which includes a corkscrew shaped core portion which is positioned within the conduit in parallel spaced relation thereto. The electromagnetic fluid treating device also includes means for mounting the core in a fixed position within the conduit, and at least one electromagnetic coil which is electrically insulated from the conduit and is positioned adjacently outside of the conduit so that the central axis of each coil either intersects or nearly intersects the core. The electromagnetic fluid treating device preferably has one or two electromagnetic coils which are each mounted sidewardly from the conduit to face toward the ferromagnetic core such that the central axis of each coil is perpendicular to the conduit. Alternatively, the coil or coils could be entrained around the conduit. The electromagnetic fluid treating device preferably further includes a power supply means which is connected to the coils to provide an oscillating voltage across the coils. Preferably that voltage will oscillate within the radiofrequencxy range of about 1 kilohertz to 1,000 megahartz so that the coil or coils act as antennae emitting radio waves. The core may include a longitudinal ferromagnetic rod portion which extends axially inwardly into the conduit from near an upper end of the conduit. Such a ferromagnetic rod portion preferably would be connected to and coaxial with the corkscrew shaped core portion.

38 Claims, 3 Drawing Sheets

U.S. PATENT DOCUMENTS

| | | | |
|---|---|---|---|
| 4,151,090 | 4/1979 | Fava | 210/222 |
| 4,157,963 | 6/1979 | Jessop et al. | 210/222 |
| 4,167,480 | 9/1979 | Mach | 210/223 |
| 4,210,535 | 7/1980 | Risk | 210/222 |
| 4,216,092 | 8/1980 | Shalhoob et al. | 210/222 |
| 4,226,720 | 10/1980 | Brigante | 210/222 |
| 4,265,754 | 5/1981 | Menold | 210/222 |
| 4,265,755 | 5/1981 | Zimmerman | 210/222 |
| 4,278,549 | 7/1981 | Abrams et al. | 210/695 |
| 4,288,323 | 9/1981 | Brigante | 210/222 |
| 4,289,621 | 9/1981 | O'Meara, Jr. | 210/222 |
| 4,299,701 | 11/1981 | Garrett et al. | 210/222 |
| 4,326,954 | 4/1982 | Shroyer | 210/222 |
| 4,347,133 | 8/1982 | Brigante | 210/223 |
| 4,373,494 | 2/1983 | McMahon | 123/538 |
| 4,381,754 | 5/1983 | Heckel | 123/538 |
| 4,407,719 | 10/1983 | Van Gorp | 210/695 |
| 4,417,984 | 11/1983 | O'Meara, Jr. | 210/695 |
| 4,427,544 | 1/1984 | Roch | 210/222 |
| 4,428,837 | 1/1984 | Kronenberg | 210/222 |
| 4,490,252 | 12/1984 | Brigante | 210/222 |
| 4,601,834 | 7/1986 | Bailes et al. | 210/748 |
| 4,659,479 | 4/1987 | Stickler et al. | 210/695 |

ELECTROMAGNETIC FLUID TREATING DEVICE AND METHOD

BACKGROUND OF THE INVENTION

1. Field of the Invention

This invention pertains generally to fluid treating devices, and more particularly to an electromagnetic fluid treating device.

2. Description of the Prior Art

Electromagnetic water treating devices are fairly well known in the prior art. These devices pass the fluid to be treated through a magnetic field which may be provided by electromagnetic coils or permanent magnets. These devices generally direct a fluid flow transversely across magnetic field lines which are emitted from the magnets. Additionally, the magnetic field lines across which the fluid flows must vary in direction or magnitude.

A first category of electromagnetic fluid treating devices includes those devices which utilize permanent magnets which are disposed in surrounding relation to the fluid carrying conduit. Examples of such devices are disclosed in U.S. Pat. Nos. 2,652,925 to Vermeiren, 3,349,354 to Miyata, 4,210,535 to Risk, 4,265,754 to Menold, 4,265,755 to Zimmerman, and British patent No. 675,369 to Vermeiren. A second category includes those devices with permanent magnets which are located within a pipe or other container which contains the fluid being treated. Examples of these devices are disclosed in U.S. Pat. Nos. 2,583,522 to Winslow, et al., 2,825,464 to Mack, 3,669,274 and 3,680,705 to Happ, et al., 3,680,705 to Happ, et al., 3,923,660 to Kottmeier, 3,951,807 to Sanderson, 4,157,963 to Jessop, et al., 4,167,480 to Mach, 4,216,092 to Shalhoob, et al., 4,278,549 to Abrams, et al., 4,289,621 and 4,417,984 to O'Meara, Jr., 4,428,837 to Kronenberg, and British patent No. 675,369 to Vermeiren. With the two permanent magnet types of devices, the magnetic field lines generally are normal to the fluid flow only near the polar ends of the bar magnets. Also, the size of the magnetic field is limited by the size limitations of the permanent magnets.

A third category of electromagnetic fluid treating devices includes those devices which have one or more electromagnets which surround or are positioned alongside the conduit or container containing the fluid being treated. Such devices are disclosed in U.S. Pat. Nos. 438,579 to Faunce, et al., 1,949,660 to Roberts, 2,596,743, and 2,652,925 to Vermeiren, 2,939,830 to Green, et al., 4,299,701 to Garrett, et al., 4,326,954 to Shroyer, 4,407,719 to Van Gorp, 4,659,479 to Stickler, et al., and British patent Nos. 625,732 and 675,369 to Vermeiren. U.S. Pat. Nos. 438,579 to Faunce, et al., 1,949,660 to Roberts, and 3,349,354 to Myata, also disclose imposing an electric field on the fluid in addition to the magnetic field. The patents to Faunce, et al. and Green, et al. disclose electric coils which are positioned axially at right angles to the conduit on which they are mounted. The patent to Green, et al. also discloses an electromagnet which is located within the container through which the fluid being treated flows.

A fourth category of devices is a variation on the third category wherein the device includes an impeller which is located within the fluid carrying conduit, and which is caused to rotate by the fluid flowing therethrough. Such devices are disclosed in U.S. Pat. Nos. 4,151,090 to Fava, 4,226,720, 4,288,323 and 4,347,133 to Brigante, and 4,427,544 to Roch. The impeller in these devices is a rotating core with a helical band or blade which causes the core to rotate as the fluid passes along side the core. A direct current is used to provide electrical power for the magnetic coils in these devices. Mechanical failure in these devices could cause the core to stop rotating.

U.S. Pat. No. 4,601,834 to Bailes, et al. discloses applying a unidirectional, varying electrical field across a portion of the flow path of a liquid dispersion to separate out the components of the dispersion. The treatment of a polluted medium such as wastewater by directly injecting audiofrequency energy into an ionized waste material to dissociate the organic compounds is disclosed in U.S. Pat. No. 3,625,884 to Waltrip.

SUMMARY OF THE INVENTION

An electromagnetic treating device includes a conduit which is formed of a nonmagnetic material and which has an inlet and an outlet so that the fluid being treated can pass through the conduit in a direction which is parallel to the axis of the conduit, and a ferromagnetic core which includes a fixed corkscrew shaped core portion which is positioned in the conduit in spaced relation to the conduit such that the axis of the core is parallel to the conduit axis. The ferromagnetic core is exposed to fluid flowing through the conduit. The electromagnetic fluid treating device also includes means for mounting the core in a fixed position within the conduit. The core mounting means may include a plug which is adapted to fit into and sealingly close an opening at the end of the conduit, and a nonconductive rod portion which at a first end thereof is rigidly connected to the plug and which extends axially inwardly into the conduit. The nonconductive rod portion has a second end to which the core is rigidly attached. Thus a means for electrically insulating the core from a conduit which is grounded is provided by the nonconductive rod portion. If the conduit is not grounded, there should be some means for grounding the fluid within the conduit. The core may include a ferromagnetic longitudinal rod portion having a first end which is rigidly attached to the second end of the nonconductive rod portion. The longitudinal ferromagnetic rod portion has a second end to which the corkscrew shaped core portion is rigidly attached. Alternatively, the ferromagnetic core could be rigidly attached directly to the plug, in which case at least a portion of the plug to which the core is attached should be formed of a nonconductive material.

A first preferred electromagnetic fluid treating device includes two electromagnetic coils which are electrically insulated from the conduit and which are mounted or positioned outside the conduit to face toward the ferromagnetic core such that a common central axis of each coil is substantially perpendicular to the conduit axis and is intersecting or is nearly intersecting the core. The two coils are connected electrically in parallel and are positioned in series magnetically, and are each located sidewardly from the conduit with the conduit located between the two coils.

A second preferred electromagnetic fluid treating device includes a single electromagnetic coil which is electrically insulated from the conduit and which is mounted sidewardly outside the conduit to face toward the ferromagnetic core such that the central axis of the coil is substantially perpendicular to the conduit axis and is either intersecting or almost intersecting the core.

An alternative electromagnetic fluid treating device includes a single electromagnetic coil which is entrained around the conduit in close proximity therewith.

Preferably, the electromagnetic fluid treating device furthermore includes a power supply means which is connected to the one or more coils for providing an oscillating voltage across the coils. The power supply may provide a voltage which oscillates within the radiofrequency range of about 1 kilohertz to 1,000 megahertz so that the one or more coils act as antennae radiating radio waves toward the core. The use of a radiofrequency power supply connected to the coils of an electromagnetic treating device having any type of ferromagnetic core therein would be considered within the spirit of this invention.

A method for electromagnetically treating fluid includes the steps of providing a ferromagnetic core including a corkscrew shaped core portion within and in parallel spaced relation to a conduit formed of a nonmagnetic material which has an inlet and an outlet, so that the core is exposed to fluid flowing through the conduit, providing an oscillating voltage across at least one electromagnetic coil which is electrically insulated from the conduit and which is mounted adjacently outside the conduit such that a central axis of each coil either intersects or nearly intersects the core, and passing the fluid being treated through the conduit in a direction parallel to the conduit axis so that the fluid moves across an electromagnetic field of the coils and contacts and moves around the exposed core. Preferably the electromagnetic coil should face toward the ferromagnetic core such that the central axis of each coil is substantially perpendicular to a conduit axis and intersects or nearly intersects the core. Alternatively, the coil could be entrained around the conduit. The voltage applied across the electromagnetic coils may oscillate within the radiofrequency range of about 1 kilohertz to 1,000 megahertz, so that each coil acts as an antenna radiating radio waves toward the core. The method of using radiofrequency oscillating power connected to the coil or coils of the device is considered to be in the spirit of this invention, even with devices which have differently shaped cores.

A primary object of the invention is to provide an improved electromagnetic fluid treating device without moving parts.

A second object of the invention is to provide an electromagnetic fluid treating device wherein the core which is positioned within the conduit includes a ferromagnetic corkscrew shaped core portion which is mounted within the conduit in spaced relation thereto and in a fixed position with its axis parallel to or colinear with the conduit axis.

Another object of the invention is to provide an electromagnetic fluid treating device in which the ferromagnetic core is easily removed for cleaning or replacement thereof.

An additional object of the invention is to provide an electromagnetic fluid treating device which includes one or more electromagnetic coils which are electrically insulated from the conduit and are mounted outside of the conduit to face toward the ferromagnetic core such that a central axis of each coil is substantially perpendicular to the conduit axis and is either intersecting or nearly intersecting the core.

A further object of the invention is to provide an electromagnetic fluid treating device which includes a power supply means which is connected to the coils for providing an oscillating voltage cross the coils, wherein the voltage oscillates within the radiofrequency range of about 1 kilohertz to 1,000 megahertz.

Yet another object of the invention is to provide an electromagnetic fluid treating device which in addition to preventing scaling on the internal surfaces of components within the fluid system, also inhibits the growth of algae and bacteria within that system.

Yet an additional object of the invention is to provide an electromagnetic fluid treating device which can be utilized to decrease the biological and chemical oxygen demand of the fluid being treated.

Yet a further object of the invention is to provide an electromagnetic fluid treating device which eliminates taste and odors, and provides cathodic corrosion protection and other advantages in fluid treatment processes.

Other objects, features and advantages of the invention will be apparent from the following detailed description taken in conjunction with the accompanying drawings wherein preferred embodiments of the invention have been selected for exemplification.

DESCRIPTION OF PREFERRED EMBODIMENTS

Figure 1:
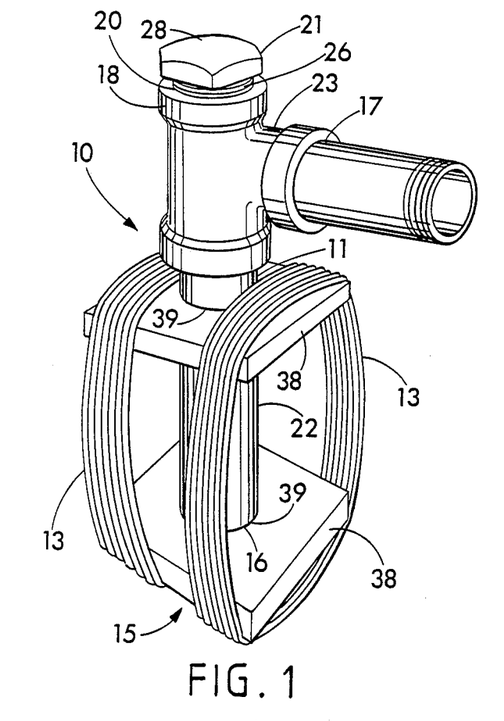
FIG. 1 is a perspective view of the first preferred electromagnetic fluid treating device.
Figure 2:
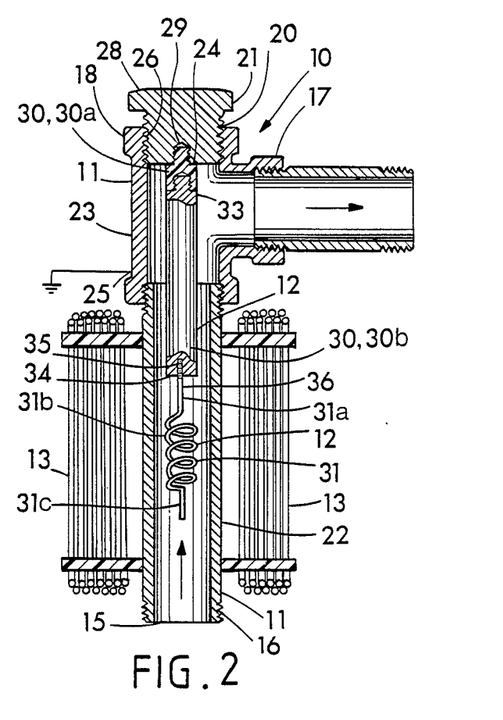
FIG. 2 is a longitudinal section view of the first preferred electromagnetic fluid treating device which is shown in FIG. 1.

With reference to the drawings, a first preferred electromagnetic fluid treating device is shown in FIGS. 1 and 2. As shown in FIG. 2, the device 10 includes a conduit 11 through which the fluid flows, a ferromagnetic core 12 which is positioned within the conduit 11 so that the fluid may flow past the core 12, and two electromagnetic coils 13 which are mounted outside the conduit to face toward the ferromagnetic core 12 such that a central axis of each coil 13 is substantially perpendicular to the core 12 and conduit 11 axis.

The conduit 11 is formed from a nonmagnetic material and includes an inlet 15 at its lower end 16 and an outlet 17 which is located near to the upper end 18 of the conduit 11. The outlet 17 opens perpendicularly with respect to the conduit 11 axis so that the upper end 18 of the conduit 11 can be used for mounting the core 12. The upper end 18 of the conduit 11 forms an opening 20 into which the plug 21 is adapted to fit into and sealingly close. Mating threads at 26 are formed around the plug 21 and on the conduit 11 around the opening 20 to allow the plug 21 to be removed from and installed into the opening 20 by turning. As shown in FIGS. 1-2, the conduit 11 includes a 1½ inch inside diameter brass pipe 22 which at one end is screwed into a tee fitting 23. Although the conduit 11 as shown is formed from pipe 22 and tee fitting 23, the conduit 11 could be formed as a single piece or as a number of pieces which are fitted together to form the conduit 11. The conduit, however, should have a longitudinal dimension that is substantially greater than its cross-section so that fluids will flow for the most part in a direction parallel to the conduit 11 axis and the core 12 axis. The metallic conduit 11 shown in FIG. 2 is grounded at 25 to thereby electrically ground the fluid flowing through the conduit 11.

The conduit 11 also could be formed from another nonmagnetic material such as plastic. If the conduit 11 were made of a completely nonconductive material such as plastic, preferably the conduit 11 should include some means for electrically grounding the fluid. For example, a small conductive screw which is connected to a ground wire could be inserted through a small threaded hole in the conduit 11 to make electrical contact with the fluid.

The plug 21 sealingly closes the opening 20 into the conduit 11 and helps to maintain the core 12 in its position along the axis of the conduit 11. The plug at its outer end 28 preferably is form=d so that a tool such as a wrench may be used to install and remove the plug 21. The plug 21 has a threaded hole 29 which opens axially into the conduit 11 to receive the rod 30.

The ⅜ inch diameter rod 30 shown in FIG. 2 includes a nonconductive rod portion 30a, and a ferromagnetic rod portion 30b which is part of the ferromagnetic core 12. A first end 24 of the nonconductive rod portion 30a is threaded to fit into the threaded hole 29 in the plug 21. A second end 27 of the nonconductive rod portion 30a forms a threaded axial hole to receive the threaded first end 33 of the ferromagnetic rod portion 30b. A second end 34 of the ferromagnetic rod portion 30b has a threaded hole 35 to receive the corkscrew shaped core portion 31.

The core 12 includes both the ferromagnetic rod portion 30b and the corkscrew shaped core portion 31. The corkscrew shaped core portion 31 is formed from a ⅛ inch diameter steel rod which is threaded at its first end 36 to facilitate mounting onto the rod 30 in the threaded hole 35. Most of the corkscrew shaped core portion 31 is formed into a helix 31a with an approximately ⅜ inch outside diameter and 1¾ inch length. The corkscrew shaped core portion includes a straight base 31a which is screwed into the rod 30, the helix 31b, and a stub 31c which extends from the helix 31b. As shown in FIG. 2, the axes of both the rod 30 and the corkscrew portion 31 lie substantially along the central axis of the conduit 11, and are perpendicular to a central axis of the coils 13. Thus as fluid moves through the conduit 11 in a direction parallel to the axis of the conduit 11, the fluid flows generally lengthwise along the exposed core 12, and transversely across the magnetic field of the coils 13. The core 12 including both the corkscrew portion 31 and the ferromagnetic rod portion 30b are removably mounted in a fixed (nonrotating) axial position within the conduit 11 by the nonconductive rod portion 30a and the plug 21. The nonconductive rod portion 30a is a means for electrically insulating the core 12 from the conduit 11, since the plug 21 shown in FIG. 2 is formed from a metallic material. Alternatively, the ferromagnetic rod portion 30b could be lengthened and the nonconductive portion eliminated if at least a portion of the plug, which is connected to the ferromagnetic rod portion 30b, were formed from nonconductive material to insulate the core 12 from the grounded brass conduit 11. If the conduit 11 were formed from a nonconductive material such as plastic, insulation of the core 12 from the conduit 11 would be unnecessary, since the conduit 11 would insulate the core 12 from the ground 25.

Although the core 12 in the device 10 shown in FIG. 2 includes both the ferromagnetic corkscrew shaped core portion 31 and the ferromagnetic rod portion 30b, alternatively the rod 30 could be formed entirely of the nonconductive rod portion 30a so that a ferromagnetic rod portion 30b would not be included as a part of the ferromagnetic core 12. The rod 30 shown in FIG. 4 is formed entirely from plastic so that the core 12 is formed entirely of the corkscrew shaped core portion 31.

The two coils 31 of the first preferred device 10 are each located sidewardly from, but adjacent to the conduit 11 so that the conduit 11 is located between the two coaxial coils 31, as shown in FIGS. 1 and 2. The two coils 13 are positioned in magnetic series with respect to each other so that their poles are oriented the same. The coils 13 therefore form modified Helmholtz coils. The central axis of the coils 31 centrally intersects the helix 31b of the corkscrew shaped core portion 31. Alternatively, the central axis of the coils 13 might nearly intersect the core 12. In general, these coils 13 should face toward the corkscrew shaped core portion 31. The coil or coils are said to "face" an object when their axis or axes are pointed in the general direction of the object. Most importantly, the helix 31b of the corkscrew shaped core portion 31 should be entirely contained within a hypothetical cylinder having an outer perimeter which is defined by the coils 13 and a central axis which is identical to the central axis of the coils 13. The helix 31b therefore should have a length which is less than or equal to the parallel dimension of the coils 13. In the device 10 shown in FIG. 2, the helix 31b is of fairly short vertical length in comparison to the vertical dimension of the coils 13.

The coils 13 are not exactly circular in shape, but instead form a slightly rounded rectangle having a vertical length of 6 inches and a width of 3 inches. Each coil 13 is formed of 200 turns of 18 gauge insulated wire. Alternatively, the shape of the coils 13 could be elliptical or circular. This wire which forms the coils 13 is wrapped around two 3 inch by 3 inch square coil supports 38 which each have a central hole 39 therethrough so that each coil support 38 may be placed on the conduit 11 to surround the pipe 22. Each coil support 38 should be clamped, taped, glued or otherwise affixed to the conduit 11 so that it remains in place even with the coils wrapped therearound. Alternatively, the central holes 39 may be sized so that the coil supports 38 fit tightly over the pipe 22. In the first preferred device 10 shown in FIGS. 1 and 2, the two coil supports 38 are placed six inches vertically apart from one another and are equidistant from the helix 31b. Thus, the central axis of the coils 13 intersects the helix 31b centrally.

Figures 3, 4:
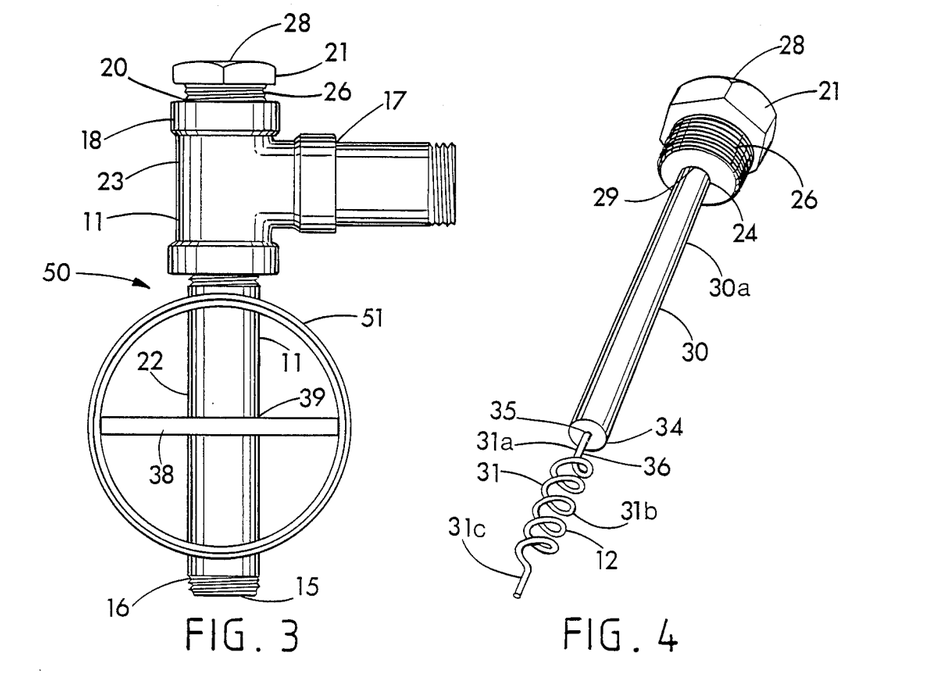
FIG. 3 is a side view of the second preferred electromagnetic fluid treating device.
FIG. 4 is a perspective view of the corkscrew shaped core portion which is screwed into the end of a plastic rod portion, which in turn is screwed into the plug.

A second preferred electromagnetic fluid treating device 50, which has a single circular electromagnetic coil 51 is shown in FIG. 3. As shown, the single coil 51 is located sidewardly from, but adjacent to the conduit 11, and is wrapped circularly around a single 3 inch by 3 inch square coil support 38 which is mounted on the conduit 11 so that the support 38 is substantially centered on a helix within the conduit 11, which is identical to the helix 31b shown in FIG. 2. The coil 51 is formed from 18 turns of 18 gauge insulated wire which is wound into a 3 inch diameter circle. Again, the central axis of the coil 51 centrally intersects the helix 31a. Except for there being single circular coil 51 in the second preferred device 50, that device 50 is substantially identical to the first preferred device 10 shown in FIGS. 1-2 and is subject to the same modifications.

Figure 5:
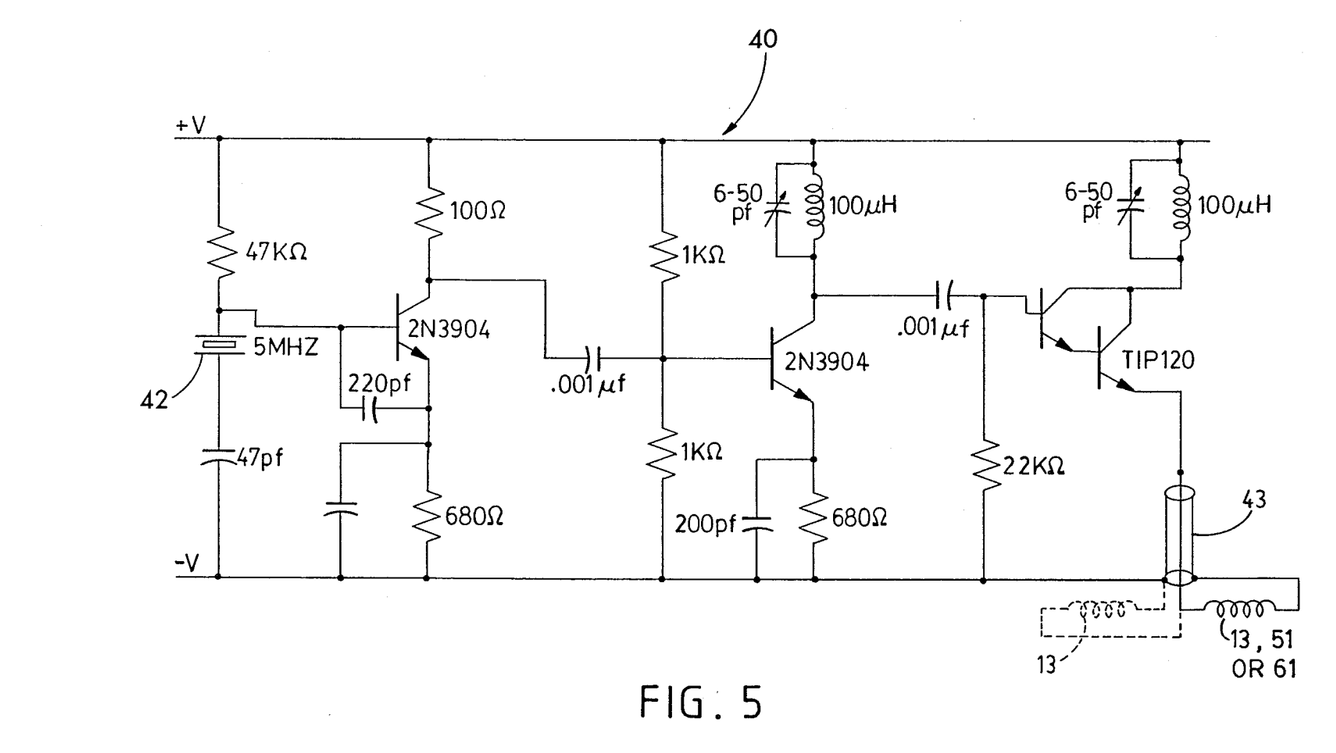
FIG. 5 is a schematic diagram of an exemplary power supply means which may be used to drive the one or more coils of the electromagnetic fluid treating device.

Both preferred devices 10 and 5 preferably further include a power supply means 40 which is electrically connected to the coils 13 or 51 for providing an oscillating voltage across the coils 13 or 51. As shown in FIG. 5, the coils 13 preferably are connected electrically to the power supply 40 in parallel. Alternatively, they could be connected to the power supply 40 in series.

An example of a power supply means 40 is shown in FIG. 5. The power supply 40 is connected to a 20 volt DC supply which in turn is powered from a regular 120 volt AC power supply. The power supply 40 is a coil-driving oscillator and amplifier unit consisting of three stages. As shown in FIG. 5, the first stage is a crystal controlled single transistor oscillator using a 5 megahertz standard crystal 42. A common emitter second stage with inductive collector load amplifies the signal produced by the oscillator. The coupling into and out of this second stage is capacitive. The third stage is an emitter follower stage which drives the magnetic field production coils 13 or coil 51 by way of a 75 ohm coaxial cable 43. The voltage which is supplied across the coils 13 or 51 therefore oscillates within the radiofrequency range of about 1 kilohertz to 1,000 megahertz, so that the coils 13 or 51 act as antennae radiating radio waves.

Although the voltage supplied by the power supply means 40 shown by way of example in FIG. 5 may oscillate at 5 megahertz, alternatively a power supply could be used which oscillates at other frequencies. Preferably though, the voltage applied across the coils 13 or 51 should oscillate within the radiofrequency range of about 1 kilohertz to 1,000 megahertz, so that radio waves are emitted from the coils 13 or 51. Of course, other frequencies could be utilized as well. For example, an electromagnetic water treating device with the ferromagnetic corkscrew shaped core portion 31 could have coils which are operated by regular 120 volt, 60 cycle AC house current.

Figure 6:
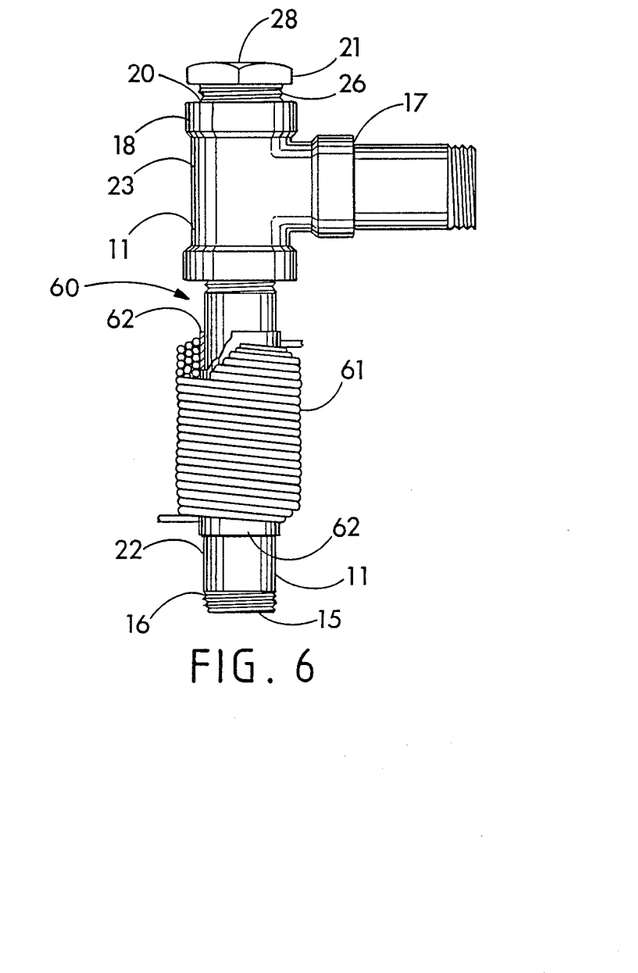
FIG. 6 is a side view of an alternative electromagnetic fluid treating device, with a portion of the coil cut away.

An alternative electromagnetic water treating device 60, which has a single coil 61 entrained about the pipe 22 in close proximity therewith is shown in FIG. 6. As shown, it is preferred that electrical insulating paper 62 be placed between the coil 61 and pipe 22. The central axis of the coil 61 shown in FIG. 6 would be identical to the conduit axis. Except for the coil 61 being wrapped around the pipe 22 with electrical paper 62 in between, the device 60 shown in FIG. 6 is substantially identical to the first and second preferred devices 10 and 50 shown in FIGS. 1-3. The alternative device 60 would preferably also include a power supply means connected to the coil 61, an example of which is shown in FIG. 5 at 40. The power supply means 40 would supply voltage across the coil 61 which would oscillate within the radiofrequency range of about 1 kilohertz to 1,000 megahertz. Even if the device 60 shown in FIG. 6 did not include a corkscrew shaped core portion 31, but instead a differently shaped core, the use of a radiofrequency power supply, connected to the coil 61 to cause radiofrequency energy to be radiated from the coil 61 to help induce a voltage on the core within the conduit, would be considered to be within the spirit of this invention. This device 60 also might include more than one coil.

The electromagnetic device 10, 50 or 60 is utilized in the treatment of fluids and the protection of the fluid system components. The device 10, 50 or 60 is particularly useful in preventing the formation of scale in boilers, cooling towers, process lines, and other components in fluid systems containing water or aqueous solutions. The device 10, 50 or 60 also can prevent corrosion within those systems and can provide other advantages as well. The radiofrequency energy which is emitted from the coils 13, 51 or 61 can inhibit the growth of algae and bacteria within the fluid. Furthermore, tastes and odors within the fluid can be diminished or eliminated. Analogously, the electromagnetic fluid treating device could be adapted for use in preventing paraffin buildup in petroleum lines. Additionally, it could be used in combination with a reverse osmosis filtration desalination and distillation system to remove minerals such as calcium carbonate and calcium sulfate before they reach and clog the semipermeable membrane. Galvanic action, which occurs in the device 10, 50 or 60 may create oxidation potentials in excess of the 1.4 volts associated with chlorination of water. Thus the electromagnetic treating device 10, 50 or 60 could be used to obtain the results of chlorination without chlorine. The electromagnetic treatment could be utilized in combination with ion exchange water softeners to decrease significantly the frequency of softener regeneration and therefore the costs of water softening. The electromagnetic energy may be applied to fluids such as wastewater to decrease the biological and chemical oxygen demand of the waste within the fluid.

The changes which occur in a fluid which is treated with the electromagnetic device 10, 50 or 60 are not entirely understood. It appears that the fluid is affected by the magnetic field, the radio waves, and the galvanic action which occurs. According to magnetohydrodynamic theory, the fluid should flow transversely across the magnetic field lines of force. Additionally, the direction or magnitude of these magnetic field lines should change or vary as the fluid flows. The coils 13 or 51 of the first and second preferred electromagnetic devices 10 or 50 are placed so that the magnetic field lines coming from the coils 13 or 51 of the devices 10 or 50 are generally perpendicular to the flow of fluid through the conduit. Since the voltage across the coils 13 or 51 oscillates, the magnitude or sense of the magnetic field varies so that the fluid is treated magnetically. The perpendicular positioning of the coils 13 or 51 to fluid flow in the first and second preferred devices 10 and 50 is particularly advantageous for utilization of the magnetohydrodynamic theory effects. However, in the alternative device 60, the magnetic field lines would be perpendicular to fluid flow near the ends of the entrained coil 61 too.

Galvanic action also occurs within the device 10, 50 or 60. The power supply means 40 through the coils 13, 51 or 61 induces a voltage in the ferromagnetic core 12, thereby exposing it to electrolysis. Through electrolysis the core 12 is sacrificed, apparently supplying the fluid with nucleation centers for crystal development. Minerals such as calcium carbonate form around these centers and tend to precipitate out in a non-scaling form. The ground 25 causes the device 10, 50 or 60 to act as an electron pump which causes oxidation reactions in the fluid. It is believed that iron within the fluid is oxidized into a magnetite type substance which also forms nucleation centers for crystal development. Iron salts may be added to the fluid to decrease fouling and decomposition of the core 12.

The shape of the corkscrew shaped core portion 31 with its helix 31b has been found to be particularly beneficial in the electromagnetic treatment of fluids. The specific reasons for this are unknown. It is known that electromagnetic treatment is more effective when fluid flow is turbulent and of sufficient velocity. Fluid flow near the helix 31b probably would be particularly turbulent. Also, in the first and second preferred devices 10 and 50, the individual turns of the helix 31b appear to be somewhat parallel to the magnetic field emitted from the coils 13 or 51 which are positioned perpendicularly to the conduit 11. This orientation between the coils 13 or 51 and helix 31b may increase flux linkages between the corkscrew shaped core portion 31 and the magnetic field. In the alternative device 60, it is believed that voltages are induced in the corkscrew shaped portion 31 to oppose the changes in voltage across the coil 61. The helical shape of the corkscrew shaped portion 31 renders it particularly effective in opposing the magnetic field changes of the coil 62. Thus, it is believed that in the alternative device 60, the fixed corkscrew shaped portion 31 is particularly advantageous for the utilization of galvanic action.

In its operation, the device 10, 50 or 60 of FIGS. 1–3 and 6 preferably should be installed into a fluid system so that the fluid enters the inlet 15 and exits through the outlet 17. The fluid thus will flow in a direction parallel to the axis of the conduit so that the core 12 along its entire surface is exposed to the fluid. As the fluid passes through the conduit 11, the oscillating power supply means should be switched on to drive the coils 13, 51 or 61. In time, the ferromagnetic core 12 may become fouled or significantly decomposed. The core 12 shown in FIG. 2 may be removed by simply turning the plug 21 with a tool to remove it from the opening 20. The ferromagnetic core 12 may then be unscrewed from the nonconductive rod portion 30a or the plug 21. The core 12 should then be cleaned or replaced. The plug 21 may then be placed back into the opening 20 and sealingly closed so that the core 12 is again properly positioned within the conduit 11 in parallel spaced relation thereto. If the entire rod 30 is formed of plastic as shown in FIG. 4, the core 12 may be replaced by simply removing the corkscrew shaped core portion 31 from the rod 30, and screwing a new one into place.

A method of use of the electromagnetic fluid treating device 10, 50 or 60 may be described as follows. A ferromagnetic core 12 including a corkscrew shaped core portion 31 is provided within and in spaced relation to a conduit 11 which is formed from a nonmagnetic material having an inlet 15 and an outlet 17. The axis of the core 12 should be parallel to the conduit 11 axis, and the core 12 exposed to fluid flowing through the conduit 11. An oscillating voltage is provided across one or more electromagnetic coils 13, 51 or 61 which are insulated from the conduit 11 and are mounted adjacently outside of the conduit 11 such that a central axis of each coil 13, 51 or 61 either intersects or nearly intersects the core 12. Preferably the central axis of the coils 13 or coil 51 of the first and second preferred device 10 or 50 centrally intersects the helix 31b on the corkscrew portion 31. The fluid being treated is passed through the conduit in a direction parallel to the conduit axis so that the fluid moves around and contacts the exposed ferromagnetic core 12. The fluid moves transversely across the electromagnetic field of the coils 13, 51 or 61. The voltage applied across the electromagnetic coils 13, 51 or 61 preferably should oscillate within the radiofrequency range of about 1 kilohertz to 1,000 magahertz, so that the coils 13 or 51 act as antennae radiating radio waves.

A power supply means which provides a radiofrequency oscillating voltage across the coils 13, 51 or 61 could be used with ferromagnetic cores of various shapes and sizes located within and in parallel spaced relation to the conduit 11, and not depart from the spirit of this invention. In the first and second preferred devices 10 and 50, the coils 13 or 51 should be positioned to face toward the ferromagnetic core such that the central axis of the coils 13 or 51 either intersects or nearly intersects the core, and so that each coil 13 or 51 acts as an antenna radiatinq radio waves toward the core. In the alternative device 60, some portion of the core should be located inside the coil 61. Fluid which passes axially through the conduit 11 contacts and moves around the exposed core and also moves transversely across the electromagnetic field of the coils 13, 51 or 61.

It is understood that the invention is not confined to the particular construction and arrangements herein illustrated and described, but embraces such modified forms thereof as come within the scope of the following claims.

What is claimed is:

1. An electromagnetic fluid treating device comprising:
   (a) a conduit formed of nonmagnetic material having an inlet and an outlet so that fluid can pass through the conduit in a direction parallel to an axis of the conduit;
   (b) a ferromagnetic core including a corkscrew shaped core portion which is positioned within the conduit in substantially parallel spaced relation thereto, and the ferromagnetic core is exposed to fluid flowing through the conduit;
   (c) means for mounting the core in a fixed position within the conduit; and
   (d) an electromagnetic coil which is electrically insulated from said conduit, said coil being located sidewardly from the conduit to face toward said ferromagnetic core such that the central axis of the coil is substantially perpendicular to the conduit axis.

2. The device of claim 1 further including means for electrically grounding the fluid flowing through the conduit.

3. The device of claim 2 the grounding means includes said conduit which is formed of a substantially electrically conductive material, wherein said conduit is electrically grounded.

4. The device of claim 3 including means for electrically insulating the core from the conduit.

5. The device of claim 1 wherein the core includes a longitudinal rod portion which is formed of a ferromagnetic material, the corkscrew shaped core portion being substantially coaxially, rigidly and removably attached thereto.

6. The device of claim 1 wherein the corkscrew shaped core portion is formed from a thin ferromagnetic rod which is shaped to include a straight base by which the corkscrew shaped core portion is mounted;

and a helix which is substantially coaxial with the straight base.

7. The device of claim 6 wherein the corkscrew shaped core portion includes a substantially coaxial stub, the helix being formed between the straight base and stub.

8. The device of claim 1 wherein the conduit has an opening at an end thereof, and the core mounting means comprises:
 (a) a plug which is adapted to fit into and sealingly close said opening; and
 (b) a nonconductive rod portion which at a first end thereof is rigidly connected to the plug and which extends axially inwardly into the conduit, the nonconductive rod portion having a second end to which the ferromagnetic core is rigidly attached.

9. The device of claim 8 wherein the conduit outlet opens sidewardly with respect to the conduit axis.

10. The device of claim 8 wherein the plug and conduit include means for allowing removal and reinstallation of the plug within the conduit opening; and the core and nonconductive rod portion include means for allowing removal and replacement of the core.

11. The device of claim 10 wherein the plug removal and reinstallation allowing means comprises mating threads on the plug and on the conduit around said opening which allow the plug and core to be removed from the conduit by turning the plug; and the core removal and replacement allowing means includes threads on an end of the core and a threaded hole within the nonconductive rod portion second end into which the threaded end of the core can be screwed and unscrewed, so that an ineffective core can be replaced with an effective one.

12. The device of claim 1 including fewer than two nonconductive rod portions which are attached to and which electrically insulate the core from the conduit, and wherein the core includes fewer than two ferromagnetic longitudinal rod portions, the corkscrew shaped core portion having a threaded end and being attached to one of said rod portions which is adjacent, said adjacent rod portion having an end with a mating threaded hole into which the threaded end of the corkscrew shaped core portion fits.

13. The device of claim 1 further including a power supply means connected to said coil for providing an oscillating voltage across said coil.

14. The device of claim 13 wherein the power supply means provides a voltage which oscillates within the radiofrequency range of about 1 kilohertz to 1,000 megahertz.

15. An electromagnetic fluid treating device comprising:
 (a) a conduit formed of nonmagnetic material having an inlet and an outlet so that fluid can pass through the conduit in a direction parallel to an axis of the conduit;
 (b) a ferromagnetic core which is positioned within the conduit in spaced relation and electrically insulated with respect thereto and which is exposed to fluid passing through the conduit;
 (c) means for rigidly mounting the core in its position within the conduit;
 (d) at least one electromagnetic coil which is electrically insulated from said conduit and is positioned adjacently outside of the conduit such that a central axis of each coil is at least in proximity to intersecting the core; and
 (e) an oscillating power supply connected to each coil for providing a voltage across each coil which oscillates within the radiofrequency range of about 1 kilohertz to 1,000 megahertz, so that each coil acts as an antenna means for radiating radio waves.

16. The device of claim 15 wherein there is one coil located sidewardly from the conduit to face toward the ferromagnetic core such that a central axis of the coil is substantially perpendicular to the conduit axis.

17. The device of claim 15 wherein there are two substantially coaxial coils positioned with respect to each other in magnetic series, each coil being located sidewardly from the conduit to face toward the ferromagnetic core such that the central axis of each coil is substantially perpendicular to the conduit axis, with the conduit located between the two coils.

18. The device of claim 15 wherein there is at least one coil entrained around the conduit in close proximity therewith.

19. The device of claim 15 further including means for electrically grounding the fluid flowing through the conduit.

20. The device of claim 19 wherein the grounding means includes said conduit which is formed of a substantially electrically conductive material, wherein said conduit is electrically grounded.

21. The device of claim 15 wherein the core includes a corkscrew shaped ferromagnetic core portion.

22. The device of claim 15 wherein the conduit has an opening at an end thereof, and the core mounting means comprises:
 (a) a plug which is adapted to fit into and sealingly close said opening;
 (b) a nonconductive rod portion which at first end thereof is rigidly connected to the plug and which extends axially inwardly into the conduit, the nonconductive rod portion having a second end to which the ferromagnetic core is rigidly attached.

23. The device of claim 22 wherein the outlet opens sidewardly with respect to the conduit axis.

24. The device of claim 22 wherein the plug and conduit include means for allowing removal and reinstallation of the plug within the conduit opening; and the core and nonconductive rod portion include means for allowing removal and replacement of the core.

25. The device of claim 24 wherein the plug removal and reinstallation allowing means comprises mating threads on the plug and on the conduit around said opening which allow the plug and core to be removed from the conduit by turning the plug; and the core removal and replacement allowing means includes threads on an end of the core and a threaded hole within the nonconductive rod portion second end into which the threaded end of the core can be screwed and unscrewed, so that an ineffective core can be replaced with an effective one.

26. A method of electromagnetically treating fluid comprising the steps of:
 (a) providing a rigidly mounted ferromagnetic core including a corkscrew shaped core portion which is positioned within and in parallel spaced relation to a conduit formed of a nonmagnetic material having an inlet and an outlet, the core being exposed to fluid flowing through the conduit;
 (b) providing an oscillating voltage across at least one electromagnetic coil which is electrically insulated from said conduit and is positioned adjacently outside of the conduit such that a central axis of each coil is at least in proximity to intersecting the core wherein the voltage oscillates within the radiofrequency range of about 1 kilohertz to 1,000 megahertz, so that each coil acts as an antenna radiating radio waves; and (c) passing the fluid being treated through the conduit in a direction parallel to the conduit axis so that the fluid contacts and moves around the exposed ferromagnetic core and transversely across the electromagnetic field of each of said coils.

27. A method of electromagnetically treating fluid comprising the steps of:
  (a) providing a rigidly mounted ferromagnetic core which is positioned within and in spaced relation to a conduit formed of nonmagnetic material having an inlet and an outlet, the ferromagnetic core being exposed to fluid flowing through the conduit;
  (b) providing an oscillating voltage across at least one electromagnetic coil which is electrically insulated from said conduit and is mounted adjacently outside of the conduit such that a central axis of each coil is at least in proximity to intersecting the core, wherein the voltage oscillates within the radiofrequency range of about 1 kilohertz to 1,000 megahertz, so that each coil acts as an antenna radiating radio waves; and
  (c) passing the fluid being treated through the conduit in a direction parallel to the conduit axis so that the fluid contacts and moves around the exposed ferromagnetic core and transversely across the electromagnetic field each of said coils.

28. An electromagnetic fluid treating device comprising:
  (a) a conduit formed of nonmagnetic material having an inlet and an outlet so that fluid can pass through the conduit in a direction parallel to an axis of the conduit;
  (b) a ferromagnetic core including a corkscrew shaped core portion which is positioned within the conduit in substantially parallel spaced relation thereto, and the ferromagnetic core is exposed to fluid flowing through the conduit;
  (c) means for mounting the core in a fixed position within the conduit; and
  (d) a pair of substantially coaxial electromagnetic coils which are electrically insulated from said conduit and which are in magnetic series with respect to each other, each coil being located sidewardly from said conduit to face toward the ferromagnetic core such that the central axis of each coil is substantially perpendicular to the conduit axis, with the conduit located between the two coils.

29. The device of claim 28 including means for electrically insulating the core from the conduit.

30. The device of claim 28 wherein the core includes a longitudinal rod portion which is formed of a ferromagnetic material, the corkscrew shaped core portion being substantially coaxially, rigidly and removably attached thereto.

31. The device of claim 28 wherein the corkscrew shaped core portion is formed from a thin ferromagnetic rod which is shaped to include a straight base by which the corkscrew shaped core portion is mounted and a helix which is substantially coaxial with the straight base.

32. The device of claim 31 wherein the corkscrew shaped core portion includes a substantially coaxial stub, the helix being formed between the straight base and stub.

33. The device of claim 28 wherein the conduit has an opening at an end thereof, and the core mounting means comprises:
  (a) a plug which is adapted to fit into and sealingly close said opening; and
  (b) a nonconductive rod portion which at a first end thereof is rigidly connected to the plug and which extends axially inwardly into the conduit, the nonconductive rod portion having a second end to which the ferromagnetic core is rigidly attached.

34. The device of claim 33 wherein the plug and conduit include means for allowing removal and reinstallation of the plug within the conduit opening; and the core and nonconductive rod portion include means for allowing removal and replacement of the core.

35. The device of claim 34 wherein the plug removal and reinstallation allowing means comprises mating threads on the plug and on the conduit around said opening which allow the plug and core to be removed from the conduit by turning the plug; and the core removal and replacement allowing means includes threads on an end of the core and a threaded hole within the nonconductive rod portion second end into which the threaded end of the core can be screwed and unscrewed, so that an ineffective core can be replaced with an effective one.

36. The device of claim 28 including fewer than two nonconductive rod portions which are attached to and which electrically insulate the core from the conduit, and wherein the core includes fewer than two ferromagnetic longitudinal rod portions, the corkscrew shaped core portion having a threaded end and being attached to one of said rod portions which is adjacent, said adjacent rod portion having an end with a mating threaded hole into which the threaded end of the corkscrew shaped core portion fits.

37. The device of claim 28 further including a power supply means connected to said coils for providing an oscillating voltage across said coils.

38. The device of claim 37 wherein the power supply means provides a voltage which oscillates within the radiofrequency range of about 1 kilohertz to 1,000 megahertz.

* * * * *